United States Patent [19]

Maltsev

[11] Patent Number: 4,752,789

[45] Date of Patent: Jun. 21, 1988

[54] MULTI-LAYER TRANSDUCER ARRAY FOR AN INK JET APPARATUS

[75] Inventor: Viacheslav B. Maltsev, Stormville, N.Y.

[73] Assignee: Dataproducts Corporation, Woodland Hills, Calif.

[21] Appl. No.: 890,604

[22] Filed: Jul. 25, 1986

[51] Int. Cl.[4] .............................................. G01D 15/18

[52] U.S. Cl. ................................ 346/140 R; 310/368; 310/328

[58] Field of Search ................ 346/140; 310/368, 347, 310/328, 346; 400/126; 29/25.35

[56] References Cited

U.S. PATENT DOCUMENTS

| | | | |
|---|---|---|---|
| 3,267,485 | 8/1966 | Howell | 346/139 C |
| 4,216,402 | 8/1980 | Engdahl | 310/346 X |
| 4,456,394 | 6/1984 | Kolm | 310/357 X |
| 4,459,601 | 7/1984 | Howkins | 346/140 |
| 4,578,686 | 3/1986 | Vollert | 346/140 |

*Primary Examiner*—Joseph W. Hartary

*Attorney, Agent, or Firm*—Woodcock Washburn Kurtz Mackiewicz & Norris

[57] ABSTRACT

A multi-layer transducer array for an ink jet apparatus having a plurality of variable-volume chambers includes a plurality of thin plates of piezoceramic material stacked one upon the other. Each of the plates are adapted to be coupled to a respective one of the chambers, and are formed with an active piezoelectric region which is separated from a structured region by a cut through the material leaving only one end of the active region connected to the structural region. One side of the active region is coated with a conductive material, thereby providing electrical connection to a thin foil strip arranged at the end of the plate remote from the chambers. Successive layers of such plates are stacked one on top of the other, with adjacent active regions staggered relative to each other, and with the thin foil strip between adjacent pairs of plates providing both mechanical isolation and a connection for electrical signals to pulse selected transducers.

5 Claims, 2 Drawing Sheets

MULTI-LAYER TRANSDUCER ARRAY FOR AN INK JET APPARATUS

BACKGROUND OF THE INVENTION

This invention relates generally to ink jet arrays including a plurality of ink jet channels where each channel includes a chamber, an inlet to the chamber, an orifice from the chamber, and transducer means coupled to the chamber for ejecting droplets of ink from the chamber as a function of the state of energization of the transducer. More specifically, this invention relates to a method of constructing a multi-layer transducer array for a densely packed multi-channel impulse ink jet apparatus.

In liquid droplet ejecting systems of the drop-on demand type, i.e., impulse ink jet printers, a piezoceramic transducer is used to cause expulsion of ink as droplets from a small nozzle or jet. An array of such jets is often utilized in high-speed, high-resolution printers where, as is well known, the printing rate and printing image resolution is dependent upon the number of jets and spacing therebetween. In general, the closer the jets are to one another, the faster the images can be produced and the higher the resulting image resolution.

In typical prior art impulse ink jet printers, printing speed is usually low and only a few jets are provided in a print head. Therefore, highly integrated heads made by combining a plurality of nozzles have been proposed and some of these devices have been put into practical application. However, the conventional ink jet head as taught by U.S. Pat. No. 4,364,067 Koto et al can include approximately seven to seventeen nozzles at best. Print quality suffers, and as a result there has been no printer of this type having printing characteristics which are comparable to the quality produced by using a solid front. Also, the integrated ink jet heads of the prior art tend to be large in size and complicated in construction.

Accordingly, layered or laminated ink jet structures have been utilized to facilitate fabrication of ink jets which necessarily require a high degree of precision. Even higher degrees of precision are required in densely packed multi-channel impulse ink jet arrays. However, there are certain limitations on high density. The most important limitation involves cross talk between channels. Of course, cross talk is undesirable and it is, therefore, necessary to provide a certain structural spacing between channels. This is sometimes achieved by using a fan-in technique such as that disclosed in U.S. Pat. No. 3,988,745—Sultan.

As also shown in Sultan, the ink jet chambers and transducers associated therewith are staggered with respect to one another. There are, however, limitations as to the amount of fanning-in which may be done and this necessarily imposes limitations on the number of channels which may be utilized in such an array. Moreover, when attempts are made to add channels by adding layers to the device, the spacing or resolution of the channels within the device is increased, i.e., the clarity is reduced.

One solution that has been proposed is taught in U.S. Pat. No. 4,392,945—Parkola, which is assigned to the assignee of the present invention and incorporated herein by reference. Parkola shows a multi-layer ink jet apparatus which includes a plurality of channels comprising chambers including inlets and orifices and transducers coupled to the chambers. The various channels are located in different layers that stagger with respect to a plane traverse to the layers so as to achieve a high density array of ink jet orifices. In such a manner, the apparatus provides a high degree of precision which is required in densely packed multi channel impulse ink jet arrays. The Parkola device, however, is of the edge-exit type which necessitates the use of either screws to maintain the entire laminated structure as a unit or an epoxy to form a bond between the laminations. It is, therefore, desirable to provide a densely packed transducer array which is not of the edge-exit type. Such an array is disclosed in the ink jet printer of U.S. Pat. No. 4,459,601—Howkins, which is assigned to the assignee of the present invention and incorporated herein by reference.

SUMMARY OF THE INVENTION

Accordingly, it is a general object of the present invention to provide a multi-channel, high-density array of ink jets.

More specifically, it is an object of the invention to provide a multi channel, high-density array of ink jets which may be readily fabricated.

It is a further specific object of this invention to achieve a multi-channel, high density ink jet array which is unlimited in the number of channels which may be employed.

In accordance with the above and other objects, a preferred embodiment of the present invention comprises an ink jet apparatus including a plurality of channels wherein each of the channels includes a chamber, and inlet opening to the chamber, and an ink droplet ejection orifice. The apparatus, in accordance with one important aspect of the invention, comprises a plurality of transducers, each associated with a respective channel. In accordance with another important aspect of the invention, each transducer is formed from a thin plate of piezoceramic material having an active piezoelectric region which is separated from its structural region by a cut made through the material by laser, diamond saw or other appropriate means leaving only one end of it connected to the structural region. One side of the active region is coated with a conductive material, thereby providing electrical connection to a thin foil strip arranged at the end of the plate remote from the chambers. Successive layers of such plates are arranged one on top of the other with a thin foil strip between adjacent pairs to provide both an electrical connection to the staggered active regions as well as providing mechanical isolation such that one active region, when it is pulsed by an electric field through the strip, does not rub against an adjacent plate.

Other objects, advantages and novel features of this invention will become apparent from the following detailed description of a preferred embodiment when considered in conjunction with the accompanying drawings wherein:

DETAILED DESCRIPTION OF A PREFERRED EMBODIMENT

Figure 1:
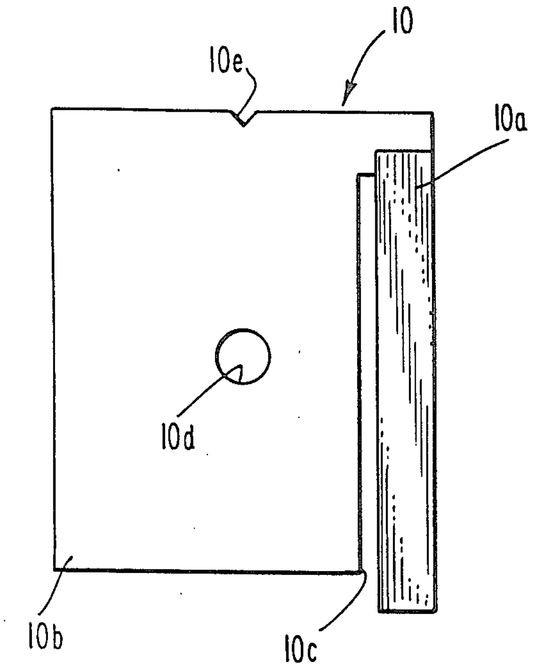
FIG. 1 is a plan view of a thin piezoceramic plate used to form a single transducer element of a densely packed ink jet array according to the present invention.

Referring now to the drawings, wherein like characters designate like or corresponding parts throughout the several views, there is shown in FIG. 1 a thin plate 10 formed of any suitable piezoceramic materials such as lead zirconate titanate (PZT) and having an active piezoelectric region 10*a* (indicated by shading) and a structural region 10*b*. The active piezoelectric region 10*a* is separated from the structural region 10*b* by a cut 10*c* made through the PZT material by laser, diamond saw or other appropriate means leaving only one end of the active region 10*a* connected to the structural region 10*b*. Also shown is a registration hole 10*d* and an indexing notch 10*e*.

Figure 2:
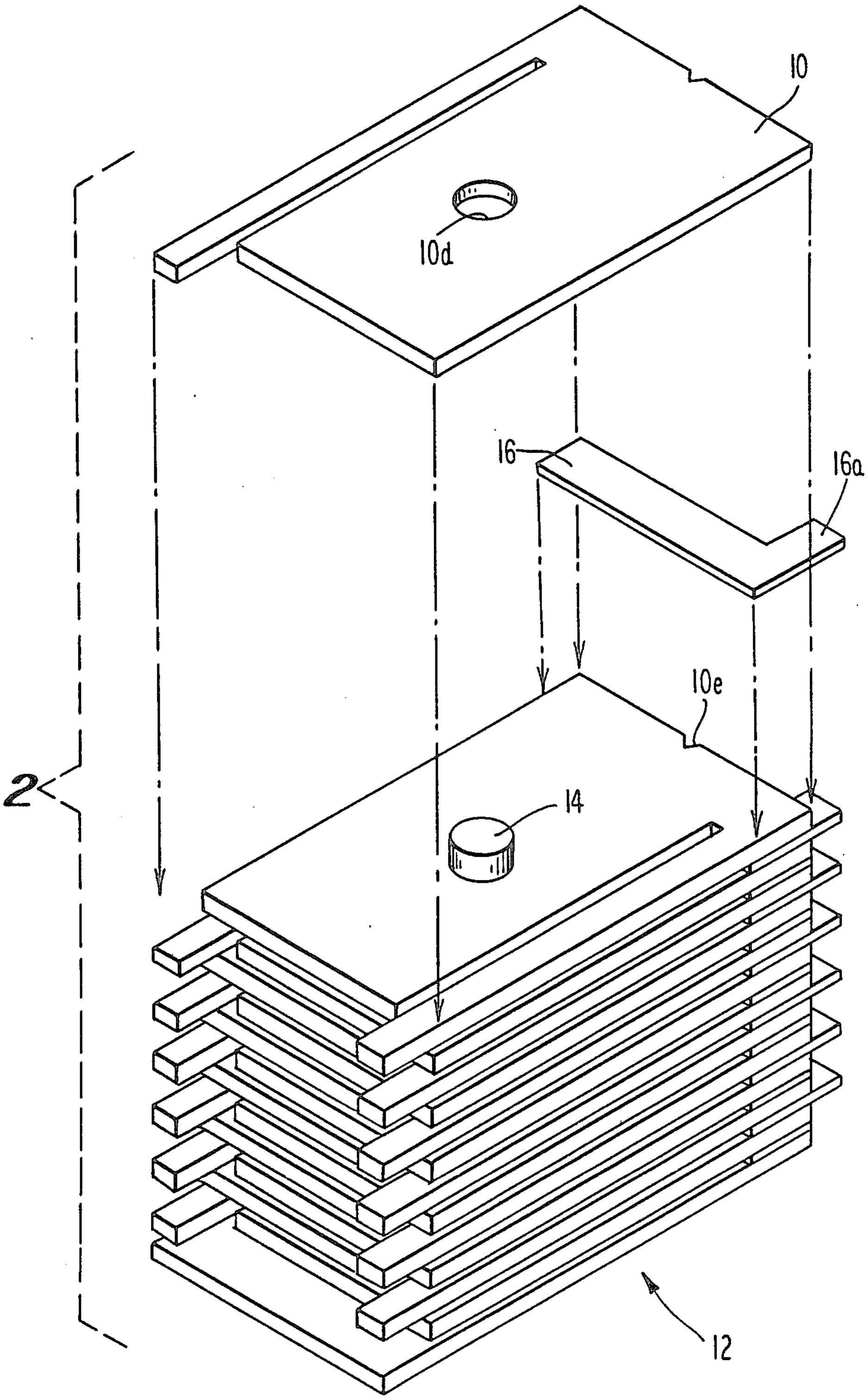
FIG. 2 is a partially exploded perspective view of a layered structure representing a preferred embodiment of the invention in an ink jet apparatus.

As shown more clearly in FIG. 2, a plurality of plates 10 are assembled into a transducer array 12 by stacking them upon a pin or screw 14. In accordance with one important aspect of the invention, the plates 10 are stacked in an alternating fashion such that adjacent transducers are staggered along the right and left side of the array 12. Between adjacent plates 10, a thin foil conductor 16 having a projecting tab 16*a* is used to make the electrical connections necessary to energize individual transducers within the array 12. In accordance with yet another important aspect of the invention, the foil conductors 16 also serve as mechanical spacers to prevent direct mechanical contact against most of the active region 10*a*.

Figure 3B:
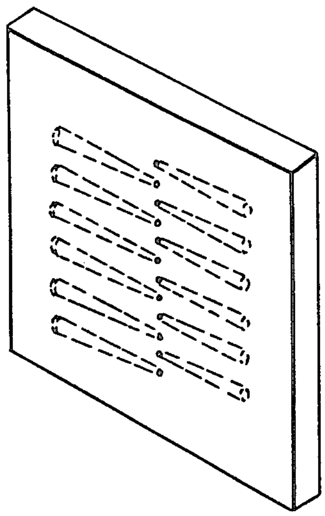
FIG. 3*b* illustrates an alternative fluidic arrangement providing a single row of nozzles.
Figure 3A:
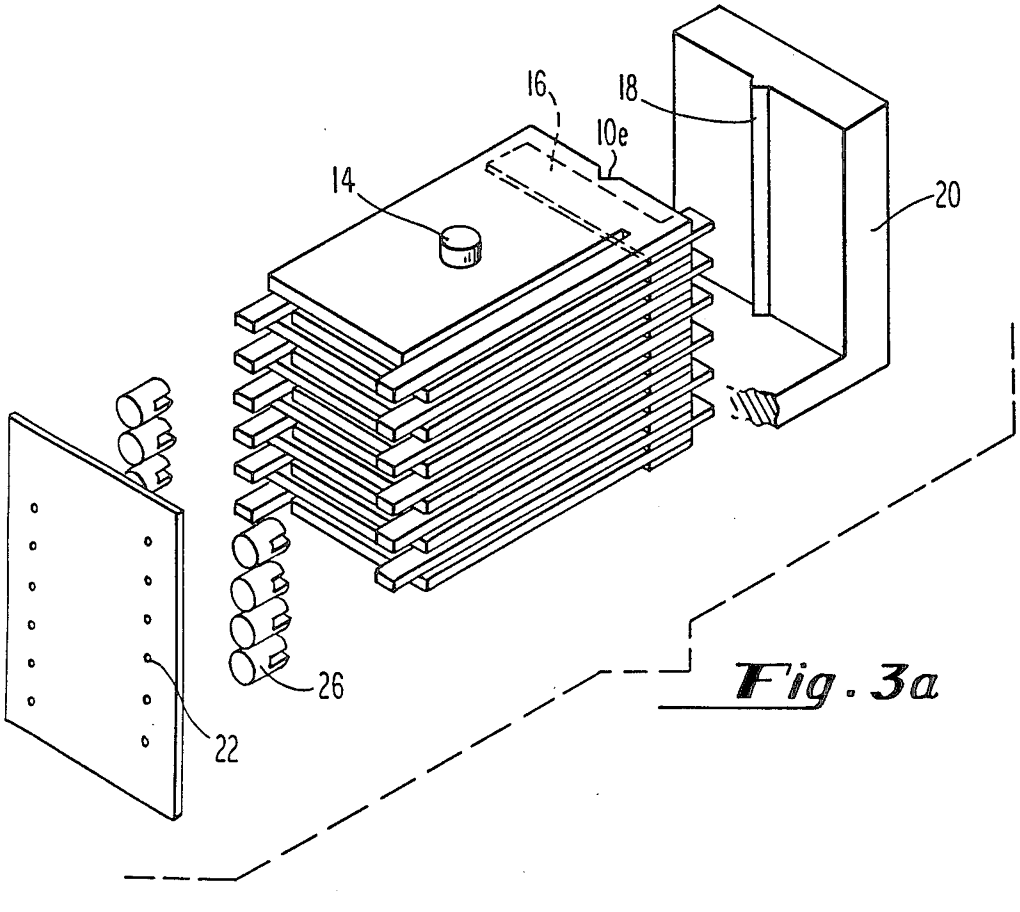
FIG. 3*a* is a perspective view of the layered structure shown in FIG. 2 as it is incorporated into an ink jet apparatus according to the invention.

Very precise mechanical location of individual transducers is achieved by interaction of the pin or screw 14 and the indexing notch 10*e*. For example, referring now to FIG. 3*a*, a triangular key 18 may be formed at the rear of a suitable printhead 20, such as that which is disclosed in the aforedescribed U.S. Pat. No. 4,459,601, in order to accurately arrange the transducer array 12 with respect to its associated array of orifices 22. The density of the orifices 22 is only limited by the thickness of the individual plates 10 since the thickness of the thin foil conductor 16 is negligable. Alternatively the density of the orifices 22 can be suitably doubled by arranging the orifices 22 in a single row as shown in FIG. 3*b* by employing suitable fluidics comprised of ink channels 24 which fan-in from their respective transducers 10*a*.

Like the transducers disclosed in the aforedescribed U.S. Pat. No. 4,459,601, the transducers 10*a* at their free ends are each connected to a respective transducer foot 26 for coupling with the ink jet chambers by an elastomeric potting compound such as silicone rubber. This "potted foot" configuration is presently preferred over the diaphram designs illustrated in the aforementioned references for reasons of reliability and durability. It should be noted that each of the transducers 10*a* thus connected expand and contract in a direction having at least one component extending parallel with the direction of droplet ejection through the orifices 22, and elongated in such direction, the electric field resulting from an energizing voltage being applied transverse to the access of elongation at the electrical connection to the foil conductors 16 in contact with silver or nickel electrodes 17.

Also particular embodiments of the invention have been shown and described and various modifications suggested, it will be appreciated that other embodiments and modifications which falls within the true spirit and scope of the invention as set forth in the appended claims will occur to those of ordinary skill in the art.

What is claimed is:

1. An ink jet array, comprising:

a plurality of variable volume chambers, each of said chambers having an ink droplet ejecting orifice;

transducer means adapted to expand and contract along an axis of elongation in response to an electric field substantially transverse to the axis of elongation, said transducer means formed of a plurality of plates equal in number to said plurality of chambers, said plates being stacked one on top of another separated by a plurality of thin conductors arranged between adjacent pairs of said plates to provide an electrical connection thereto and prevent mechanical contact therebetween across a substantial portion thereof; and coupling means between each of said chambers and said plates for expanding and contracting said chambers in response to expansion and contraction along the axis of said transducer means.

2. An ink jet array according to claim 1, wherein said plates are each comprised of:

a substantially rectangular slab of piezoceramic material having an active region and a structural region, said active region protruding from an edge of said slab proximate to said chambers and being separated from said structural region substantially along its entire length; and an electrode formed upon the length of one side of said active region.

3. An ink jet array according to claim 2, wherein said electrodes are selected from the group of silver or nickel.

4. An ink jet array according to claim 1, wherein said conductors are silver foil.

5. An ink jet array according to claim 1, further comprising a registration pin, each of said plates having formed therein a registration hole for stacking upon said registration pin and an indexing notch for maintaining precise alignment between said transducer means and said chambers.

* * * * *